(12) United States Patent
Snyder et al.

(10) Patent No.: US 8,374,760 B2
(45) Date of Patent: Feb. 12, 2013

(54) CONTROL OF MULTI-SPEED TRANSMISSION

(76) Inventors: Mark Snyder, Fountain Valley, CA (US); Ronald A. Holland, Orange, CA (US)

(*) Notice: Subject to any disclaimer, the term of this patent is extended or adjusted under 35 U.S.C. 154(b) by 634 days.

(21) Appl. No.: 12/650,396

(22) Filed: Dec. 30, 2009

(65) Prior Publication Data

US 2010/0168971 A1    Jul. 1, 2010

Related U.S. Application Data

(60) Provisional application No. 61/142,141, filed on Dec. 31, 2008.

(51) Int. Cl.
*G06F 7/00* (2006.01)
*G06F 17/00* (2006.01)
*G06F 19/00* (2011.01)

(52) U.S. Cl. .......... 701/67; 701/51; 701/68; 701/64; 701/58; 701/55

(58) Field of Classification Search ...... 56/1, 11.3–11.7; 280/238
See application file for complete search history.

*Primary Examiner* — Khoi Tran
*Assistant Examiner* — Bhavesh V Amin
(74) *Attorney, Agent, or Firm* — Kenneth L. Green

(57) ABSTRACT

Apparatus and method for efficiently controlling an automatic transmission in an electric vehicle. The method may be implemented by selection of one of at least two belt clutches having different ratios. The timing for disengagement and engagement of each clutch and the proper sequencing of the disengagement and engagement of the clutches is determined to optimize the efficiency of the transmission. A direct drive motor is directly coupled to the transmission's output shaft to provide momentary power to maintain a nearly constant rate of acceleration during shifting. The method may further be applied for shifting an electric vehicle with a first motor coupled to an output shaft through a single belt clutch and a direct drive motor.

2 Claims, 4 Drawing Sheets

CONTROL OF MULTI-SPEED TRANSMISSION

The present application claims the priority of U.S. Provisional Patent Application Ser. No. 61/142,141 filed Dec. 31, 2008, which application is incorporated in its entirety herein by reference.

BACKGROUND OF THE INVENTION

The present invention relates to electric vehicles with automatic transmissions and in particular to a new, improved method of controlling the actuation of a multi-speed transmission implementing one or more clutches.

Known electric vehicles with multi-speed transmissions select a transmission ratio by engaging one of two or more clutches or positively ganging members. Either of these methods generally result in frictional drag on the system due to the disengaged clutches. U.S. Provisional Patent Application Ser. No. 61/099908 filed Sep. 25, 2008 by the present inventor and incorporated herein by reference, describes an improved clutch mechanism to reduced drag on a multi-speed transmission. While the '908 application provides reduced drag, it does not disclose an optimal method to efficiently disengage and engage the clutches at the proper times to minimized the time of clutch disengagement, the duration between shifts, and the wear on the drive system, and does not attempt to maximize the smoothness of the operation.

Additionally, disengagement of a lower ratio clutch and the subsequent engagement of a higher ratio clutch is not instantaneous and results in a period of time with no power being coupled to the drive wheels. This may results in jarring the vehicle and be an annoyance to the operator.

BRIEF SUMMARY OF THE INVENTION

The present invention addresses the above and other needs by providing apparatus and method for efficiently controlling an automatic transmission implemented by selection of one of at least two belt clutches or other mechanisms having different ratios. The timing for disengagement and engagement of each clutch and the proper sequencing of the disengagement and engagement of the clutches is determined to optimize the efficiency of the transmission. In one embodiment of the invention, at least one motor is directly coupled to the output shaft of the transmission. When multiple additional gear ratios are driven through clutches, the directly driven motor may be used to momentarily apply torque to the output shaft during the transition time when between gear selection to provide momentary power to maintain a nearly constant rate of acceleration during shifting. During this brief application of torque, the motor and controller may be driven beyond their rated sustainable power levels with there being insufficient time for these components to overheat.

In accordance with one aspect of the invention, there is provided a method for maintaining smooth acceleration across transmission shifts of an electric vehicle accomplished by disengaging a first belt clutch and engaging a second clutch. The method includes determining an amount of power to provide to an auxiliary motor to maintain a present acceleration of the vehicle, beginning disengagement of the first belt clutch, reducing power to a main motor, providing the determined amount of power to the auxiliary motor, beginning engagement of the second belt clutch, completing engagement of the second belt clutch, completing disengagement of the first belt clutch, returning power to the main motor, and removing power from the auxiliary motor.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
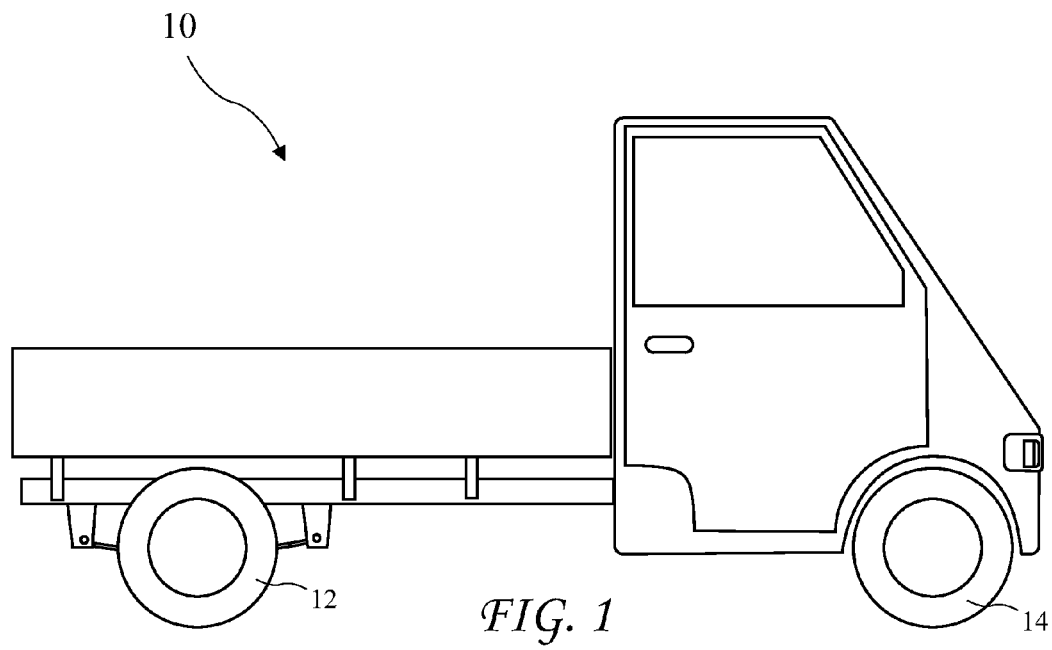
FIG. 1 is an electric vehicle suitable for application of the present invention.
Figure 2:
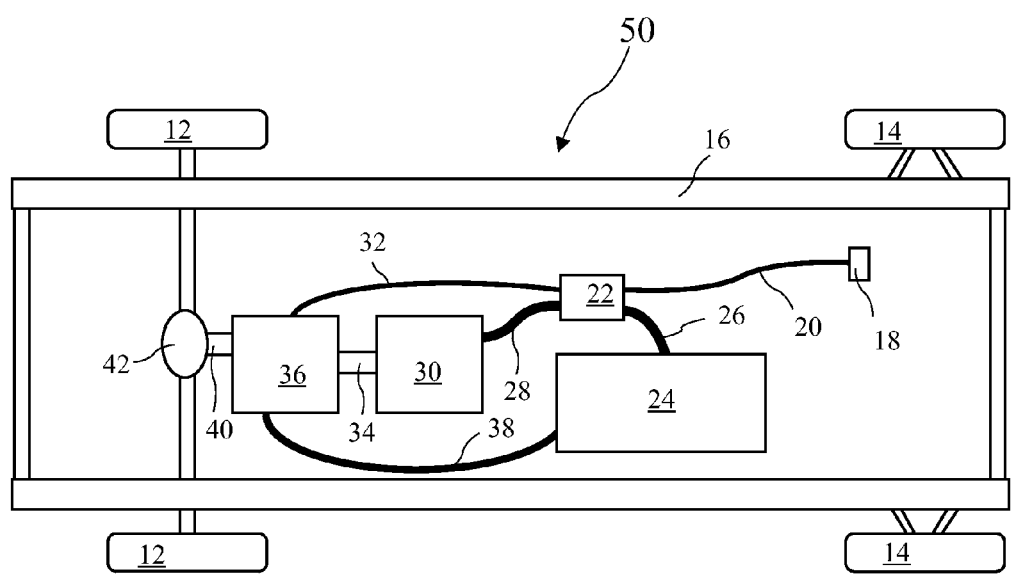
FIG. 2 is a drivetrain according to the present invention for application with the electric vehicle.

An electric vehicle 10 suitable for application of the present invention is shown in FIG. 1 and a drivetrain 50 according to the present invention and suitable for use in the vehicle 10 is shown in FIG. 2. The drivetrain 50 includes a drive shaft 40 and an axle 42 connected to drive wheels 12 for driving the vehicle 10. Operator controls 18 are used by an operator to control the driving force provided by the wheels 12. The controls 18 may be foot control, hand controls, or any form of control useable by an operator. In an instance of a remotely controlled vehicle 10, the controls 18 may be a signal receiver. The controls 18 are connected by an operator signal cable 20 carrying an operator control signal to an electronic motor/transmission controller 22. Batteries 24 are connected to the electronic motor/transmission controller 22 by battery power cable 26. The electronic motor/transmission controller 22 processes the operator signal and uses Pulse Width Modulation (PWM) to control the power provided through power cable 28 to an electric motor 30, and to generate transmission control signals provided through transmission control signal cable 32 to a transmission 36 to control gear changing and clutch engagement/disengagement and provide feedback signals from the transmission to the electronic motor/transmission controller. Power may also be carried back to the battery 24 during regenerative braking over cables 28 and 26.

The motor 30 is coupled the transmission 36 through motor coupling 34. The motor coupling 34 may be a belt, a shaft, or any other mechanical coupling for carrying mechanical power. The transmission 36 is coupled to the axle 42 by transmission coupling 40 which also may be a belt, a shaft, or any other mechanical coupling for carrying mechanical power. The vehicle 10 may be a two, three, four or more wheeled vehicle, a rear wheel drive, front wheel drive, or all wheel drive, and adaptation of the drivetrain described herein is equally applicable to any selected drive wheel(s) configuration. In the embodiment shown in FIG. 2, the front wheels 14 are used for steering only.

Figure 3:
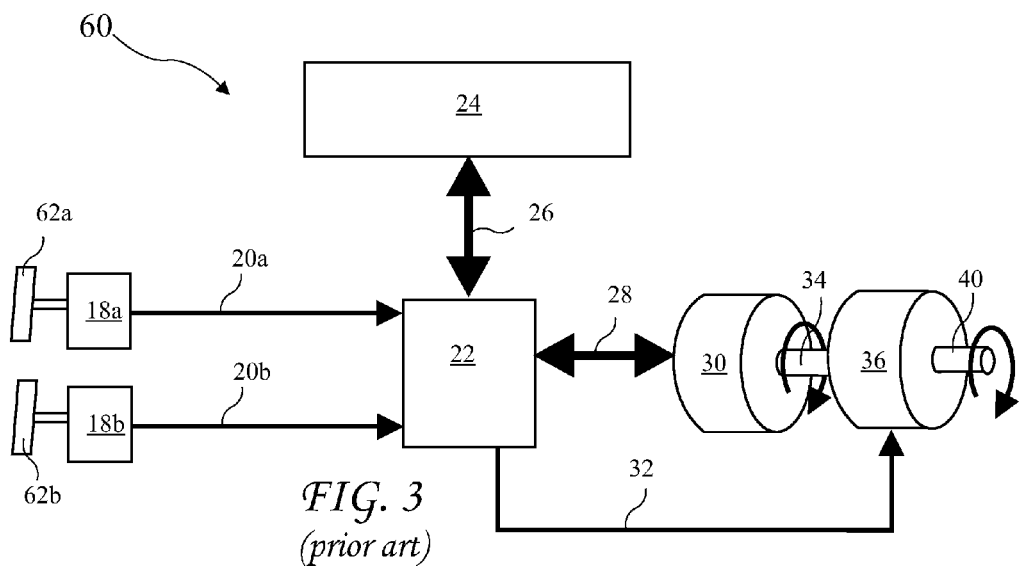
FIG. 3 is a prior art electronic control system for use with the electronic vehicle.

A prior art electronic control system 60 for the electric vehicle 10 is shown in FIG. 3. Power and braking actuators 62a and 62b respectively are mechanically coupled to a power signal transducer 18a and a braking signal transducer 18b respectively. A power signal 20a and a braking signal 20b are generated by the transducers 18a and 18b and provided to the electronic motor/transmission controller 22. The electronic motor/transmission controller 22 controls a flow of current from the battery 24 to the electric motor 30 for providing power in response to the power signal 20a, and controls a flow of current from the electric motor 30 to the battery 24 for providing electricity to recharge the battery 24 in response to the braking signal 20b. During the application of power, the electric motor 30 provides mechanical power to the transmission 36 through the coupling 34 and the transmission 36 provides mechanical power to the vehicle 10 through the coupling 40. While the electronic control system 60 may prove adequate in some instance, it does not always result in power and braking which accurately mimics the positions of the power and braking actuators 62a and 62b.

Figure 4:
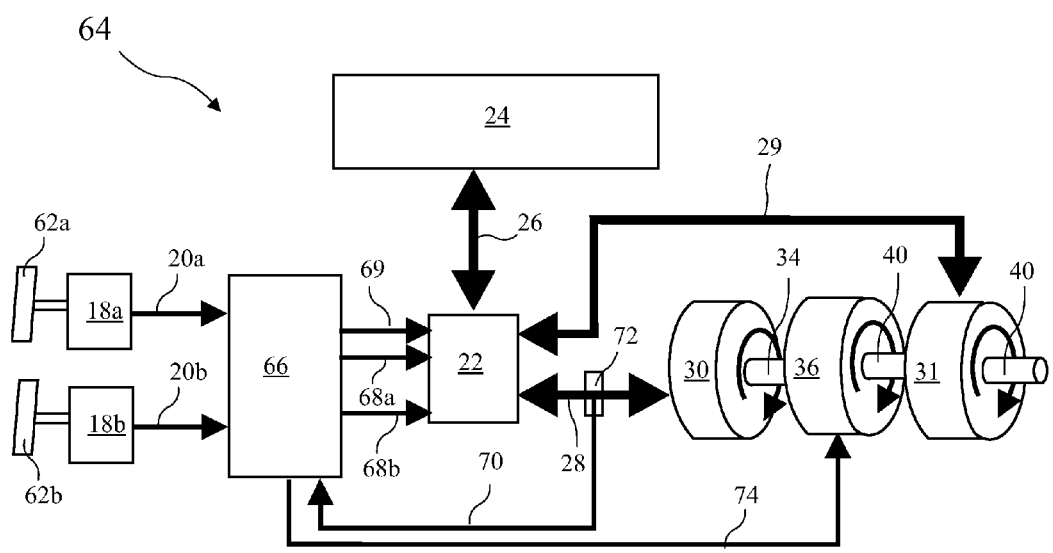
FIG. 4 is an Intelligent Electronic Control System (IECS) for use with the electronic vehicle.

An Intelligent Electronic Control System (IECS) 64 is shown in FIG. 4 which includes an intelligent controller 66 which provides adjusted operator power and braking signals 68a and 68b to the electronic motor/transmission controller 22 to provide power and regenerative braking which mimic the positions of the power and braking actuators 62a and 62b. The power signal 20a and the braking signal 20b, along with motor voltage and current signals 70, are provided to an intelligent controller 66. The intelligent controller 66 computes and provides adjusted power and braking signals 68a and 68b to the electronic controller, and transmission control signals 74 to the transmission 36, to provide acceleration and braking which mimic the positions of the power and braking actuators 62a and 62b. The motor voltage and current signals 70 are obtained from voltage and current sensors 72 residing between the electronic motor/transmission controller 22 and the electric motor 30.

The intelligent controller 66 further controls the powering of a primary motor 31 which is mechanically coupled to the coupling (or output shaft) 40 to directly drive the output shaft 40. The intelligent controller 66 provides a second power signal 69 to the electronic motor/transmission controller 22 to provide a flow of power through second power cable 29 to the motor 31. The motor 31 may be connected to the output shaft 40 on either side of the transmission 36 (see FIG. 5) and may be connect through a clutch, for example a one way clutch which automatically engages when the speed of the motor 31 exceeds the speed of the output shaft 40 and automatically disengages when the speed of the motor 31 is less than the speed of the output shaft 40. The intelligent controller 66 may also use the power signal 69 in a regenerative mode to draw power from the motor 31 to recharge the batteries 24 when the transmission down shifts during regenerative braking when the one way clutch is not present.

Figure 5:
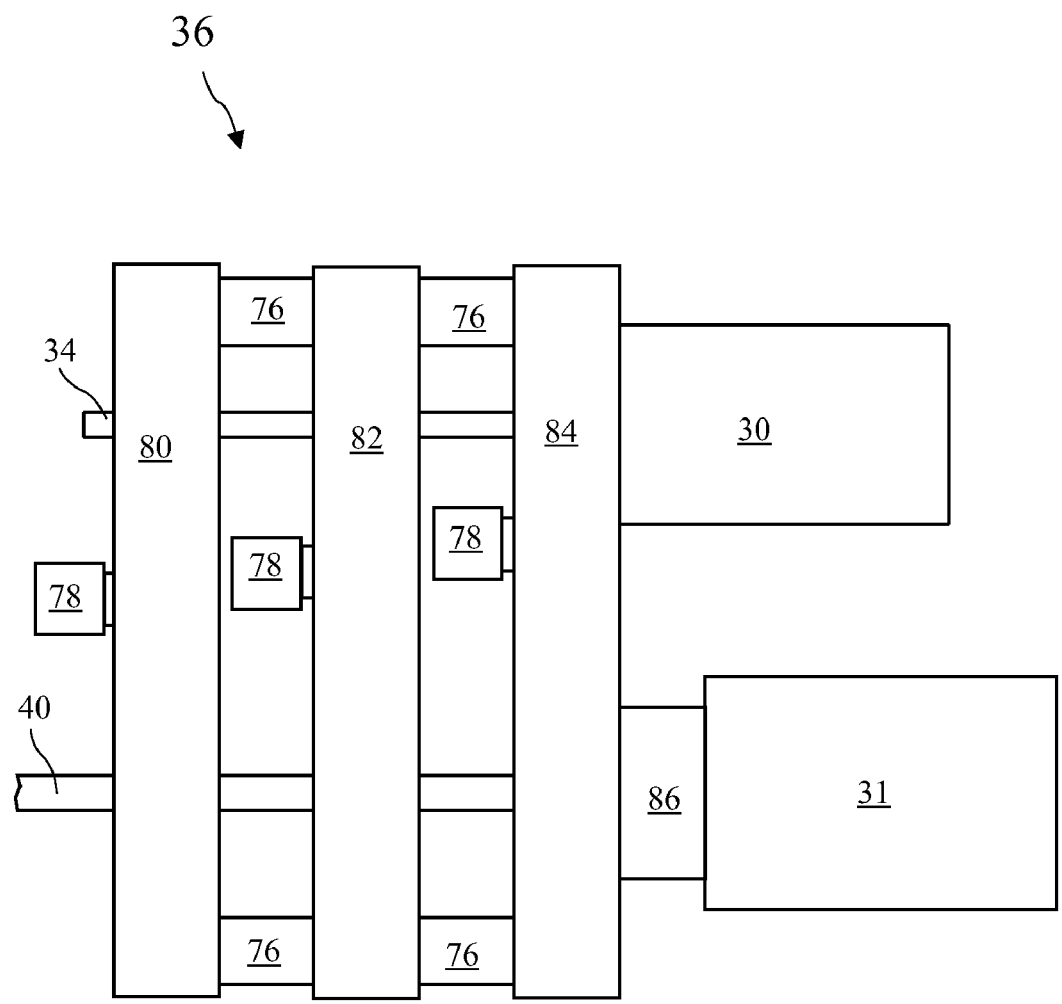
FIG. 5 shows a three speed hybrid transmission according to the present invention with direct drive capability for an internal combustion engine or a large electric motor, the hybrid transmission comprising three belt clutches each with different reduction ratios.

A three speed hybrid transmission 36 with direct drive capability for the primary motor 31, comprising three belt clutches 80, 82, and 84 each with different reduction ratios, is shown in FIG. 5. The motors 30 and 31 and the three speed hybrid transmission 36 are controlled by the intelligent controller 66 to provide smooth and efficient power to the output shaft 40. Examples of suitable belt clutches 80, 82, and 84 are of a type described in U.S. Provisional Patent Application Ser. No. 61/099,908 filed Sep. 25, 2008 by the present inventor, and incorporated above by reference. The belt clutches 80, 82, and 84 are fixedly connected together with spacers 76 between them to create space for actuators 78, and share the common input shaft 34 and the common output (or drive) shaft 40. The output shaft 40 is operatively connected to at least one wheel 12 to drive the vehicle 10 (see FIG. 2). The electric motor 30 is mounted to the belt clutch 36 and drives the shaft 34. The primary motor 31 is connected either directly to the output shaft 40 or disengageably through a clutch 86. The clutch 86 may be a uni-directional clutch, such as a clutch bearing or the like, so that when the electric motor 30 alone is driving output shaft 40 through one of the belt clutches 80, 82, and 84, the motor 31 does not need to turn.

In some examples where the highest ratio belt clutch is less than 1:1 ratio, the primary motor 31 may provide an additional higher ratio operation, creation basically a fourth speed for a transmission comprising three belt clutches.

The engagement of the belt clutches 80, 82, and 84 is monitored to prevent the possibility of engaging multiple clutches having different ratios simultaneously, which could cause damage to the transmission 36. In one embodiment, the clutches 80, 82, and 84 are engaged and disengaged by moving actuators which apply and release tension on the belt. In order to fully disengage each clutch 80, 82, or 84, the clutch actuators must move sufficiently to assure that the corresponding belts are completely separated from pulleys on the shafts 34 and 40. As the clutches are engaged, there is a range where the clutch will be in the process of engaging but until it is fully engaged, the friction will not be adequate to drive the system. While vehicle 10 is under power and the transmission 36 shifts to a higher transmission ratio, during partial clutch engagement, the motor 30 may be dynamically braked to a speed close to the speed it will rotate when the subsequent gear is engaged or may only receive adequate power to maintain a desired rotational motor speed.

While not essential to the utility of the present invention, the direct drive motor 31 may be used as the primary motor in a high gear. In this embodiment, as the intelligent controller 66 signals the transmission 36 to transition the clutches 80, 82, or 84 from being either fully engaged or disengaged there is period of time between being fully engaged and disengaged where there is partial engagement, and no power may be applied from the from motor 30 through the clutches to output shaft 40 without experiencing belt slippage. Such belt slippage increases wear on belts, creates heat, and wastes energy. During the shifts, the intelligent controller 66 applies current to the motor 31 at a level to maintain a reasonably constant level of acceleration while the motor 30 is not driving the output shaft 40. Because of the short duration which the motor 31 applies power, the current applied to the motor 31 may be allowed to exceed the continuous rating of the motor 31 or motor controller 22. For optimal smooth operation of the vehicle 10, the current applied to the motor 31 during the shift will be enough to maintain the desired level of acceleration throughout the shifting process. After the clutch 80, 82, or 84 is engaged, the current provided to the motor 30 and/or motor 31 as applicable will be increased at rate determined to provide a smooth increase in torque until the acceleration which was applied prior to the shift is achieved, or the maximum available current is applied to the motor 30 and/or motor 31 as applicable.

In the embodiment described above with the direct drive motor 31 being used in conjunction with the selection of ratios using the clutches 80, 82, and 84, when a specific ratio is selected, the proper level of current determined to supply the desired amount of acceleration may be provided to the motor 31 as the power is remove from the motor 30, even before the currently engaged clutch 80, 82, or 84 is disengaged. For other embodiments, some other predetermined acceleration may be achieved for the specific gear ratio transition for all input variables considered for a desired level of efficiency, safety consideration and/or feel for the operator.

Similarly, when the vehicle 10 is under power and it is desired for the transmission 36 to shift from a higher ratio clutch to a lower ratio in order to maintain power or efficiency, power will be removed from the motor 30 as the higher ratio clutch is disengaged. The lower ratio clutch will begin engagement with timing which allows the lower ratio clutch to begin to couple power from the motor 30 to the output shaft 40 as the higher ratio clutch is being disengaged and is reducing the amount of power coupled through the higher ratio clutch from the motor 30 to the output shaft 40. At the same time, enough power may be applied to the motor 30 to achieve a desired rotational speed to approximately equal the speed it will be rotating once the lower ratio clutch is engaged. Once the lower ratio clutch is completely engaged to a point that it can couple the necessary torque to power the vehicle 10, the current will be provided to the motor 30 at a smooth rate to achieve the desired level of acceleration determined for the inputs given to the intelligent controller 66. In the case of the system which implements a direct drive motor 31 in conjunction with the motor 30, power may be maintained by the motor 31 until the clutch 80, 82, or 84 is fully engaged and power is reapplied to the motor 30, and when necessary, power may be applied to the direct drive motor 31 after the lower ratio clutch is engaged, to maintain the desired level of acceleration.

In another embodiment, when all power is removed from the drive system, resulting in the vehicle 10 being allowed to coast, none of the clutches 80, 82, or 84 will be engaged until power is again applied as determined by the intelligent controller 66. At that time, the engagement process described above will be applied. When the vehicle 10 has come to a complete stop, then the lowest ratio clutch will be engaged with the motor 30 at zero RPM to anticipate the vehicle 10 being accelerated again.

In the situation where regenerative braking is being employed through the drivetrain, the vehicle 10 will be shifted into lower ratios as the vehicle 10 slows down at the point determined to provide a desired deceleration while maximizing power battery recharging. The shifting sequence during deceleration will be the same as described above while power is being applied, with the exception of the power flow before and after the disengagement of the higher ratio and engagement of the lower ratio will be flowing from the motors 30 and 31 to the battery rather than into the motor or motors.

While the transmission 36 is described above in the context of a three speed transmission, a vehicle 10 having any transmission comprising at least one belt clutch is intended to come within the scope of the present invention. Further, while the invention is herein described having a single motor 30, in other embodiments the motor 30 may be replaced by two or more motors, and any electric vehicle with a motor or motors driving an input shaft of a transmission, and having an auxiliary motor connected directly to an output shaft of the transmission for maintaining acceleration during shifting and power the vehicle in high gear is intended to come within the scope of the present invention.

Figure 6:
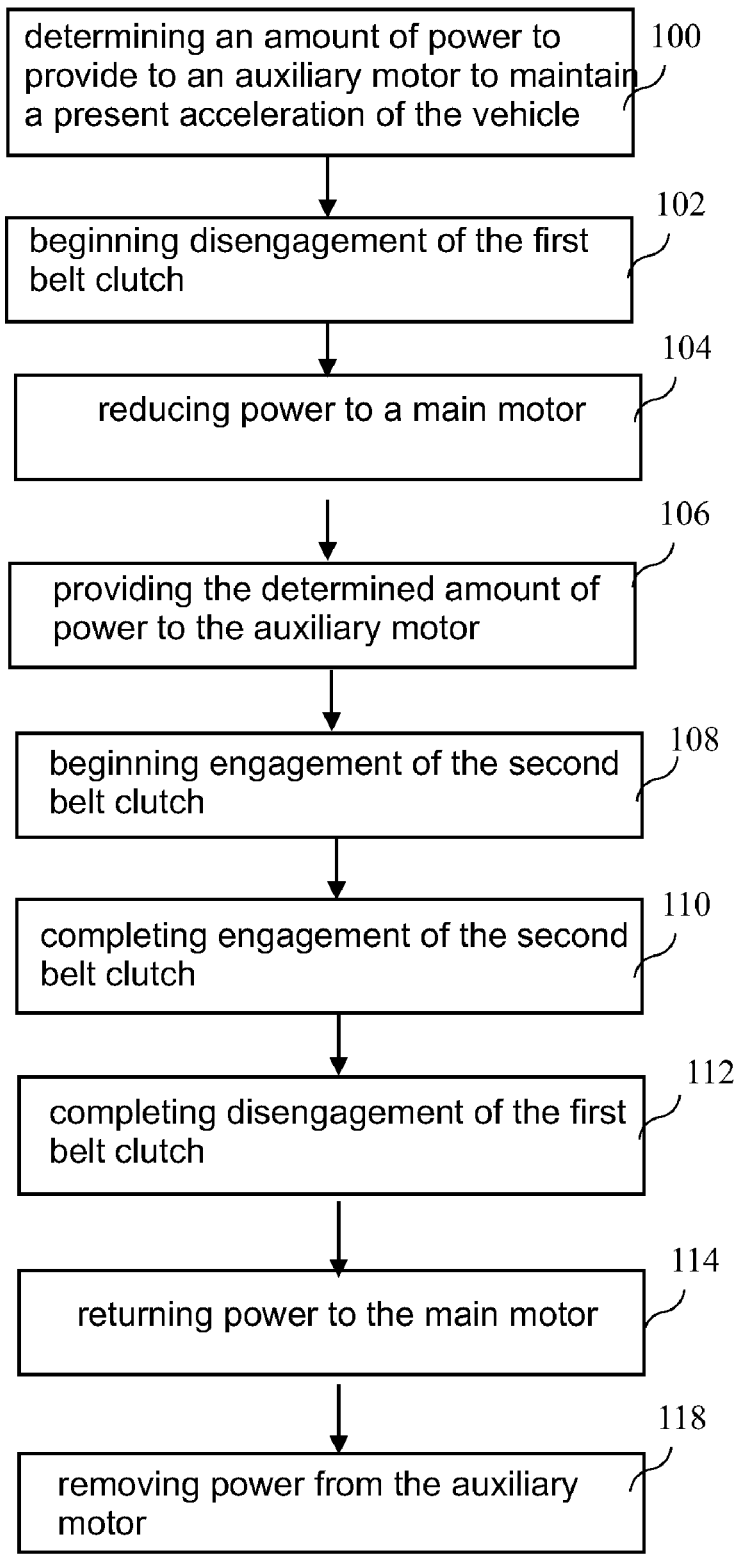
FIG. 6 is a method according to the present invention.

A method for maintaining constant acceleration across transmission shifts according to the present invention is described in FIG. 6. The shifting is accomplished by disengaging a first belt clutch having a first ratio, and engaging a second belt clutch having a second ratio of a transmission coupling a first motor to an output shaft. The method includes determining an amount of power to provide to a direct drive motor to maintain a present acceleration of the vehicle during shifting at step 100, beginning disengagement of the first belt clutch at step 102, reducing power to first motor at step 104, providing the determined amount of power to the direct drive motor at step 106, beginning engagement of the second belt clutch at step 108, completing engagement of the second belt clutch at step 110, completing disengagement of the first belt clutch at step 112, returning power to the first motor at step 114, and removing power from the direct drive motor at step 116.

While the invention herein disclosed has been described by means of specific embodiments and applications thereof, numerous modifications and variations could be made thereto by those skilled in the art without departing from the scope of the invention set forth in the claims.

We claim:

1. A method for maintaining smooth acceleration across transmission shifts accomplished by disengaging a first belt clutch and engaging a second belt clutch of a transmission coupling a first motor to an output shaft, the method comprising:
    determining an amount of power to provide to a direct drive motor to maintain a present acceleration of the vehicle;
    beginning disengagement of the first belt clutch;
    reducing power to the first motor;
    providing the determined amount of power to the direct drive motor;
    beginning engagement of the second belt clutch;
    completing engagement of the second belt clutch;
    completing disengagement of the first belt clutch;
    returning power to the first motor; and
    removing power from the direct drive motor.

2. The method of claim 1, further including determining a timing for the disengagement of the first belt clutch and the engagement of the second belt clutch.

* * * * *